United States Patent Office 3,557,015
Patented Jan. 19, 1971

3,557,015
DUAL-SENSITIVITY DYED LIQUID TRACERS
James R. Alburger, 5007 Hillard Ave.,
La Canada, Calif. 91011
Continuation-in-part of application Ser. No. 701,259,
Jan. 29, 1968, which is a continuation-in-part of application Ser. No. 444,660, Apr. 1, 1965. This application May 14, 1969, Ser. No. 824,649
Int. Cl. G01n 19/02; C09k 1/00; F21k 2/00
U.S. Cl. 252—301.2      4 Claims

ABSTRACT OF THE DISCLOSURE

A liquid tracer composition, such as an inspection penetrant, a surface coating compound, or a marking material, in which a nonfluorescent indicator dye and a fluorescent indicator dye are used simultaneously in the same tracer mixture to provide two different levels of dimensional sensitivity, whereby different thicknesses of films of the tracer composition will exhibit discernible differences in nonfluorescent or fluorescent color response. The compositions of the invention are especially useful in "dual-sensitivity inspection penetrants," for example, where relatively large surface cracks may be revealed as visible nonfluorescent color indications, while micro-fine surface cracks are revealed as fluorescent indications.

RELATED PATENTS AND PATENT APPLICATIONS

U.S. Pat. No. 3,107,298, "Apparatus for the Measurement of Fluorescent Tracer Sensitivity."
U.S. Pat. No. 3,184,596, "Flaw Detection Method Using a Liquid Solvent Developer."
U.S. Pat. No. 3,282,843, "Emulsifier Compositions."
U.S. Pat. No. 3,311,479, "Penetrant Inspection Process and Compositions."
U.S. Pat. No. 3,341,705, "Method of Controlling the Thickness of Applied Liquid Films Using Dye Tracers."
U.S. Pat. No. 3,386,920, "Process for Fluorescence Detection of Extremely Small Flaws."
Appln. Ser. No. 728,458, filed May 13, 1968, for "Method and Means for Preventing Fraud in Documents."

This application is a continuation-in-part of my copending application, Ser. No. 701,259, filed Jan. 29, 1968, now abandoned, entitled "Dual-Sensitivity Dyed Liquid Tracers," which application was a continuation-in-part of application, Ser. No. 444,660, filed Apr 1, 1965, entitled "Multi-Sensitivity Dyed Liquid Tracers," both now abandoned.

This invention relates to dyed liquid tracer materials in which at least two distinctly different dye tracer effects occur simultaneously in the same liquid tracer material. More particularly, the invention relates to dyed liquid tracer materials which may yield different nonfluorescent color and fluorescent color effects depending on the thickness of a film of the liquid tracer.

Dyed liquid tracer materials, both fluorescent and nonfluorescent color, are well known and are used in a wide variety of applications, such as in dyed penetrant inspection materials, additive tracers for cements, adhesives, potting compounds, soldering fluxes, marking materials, and surface coatings, and in many other materials and use applications wherein it is desired to provide a visible color or fluorescent indication as to the presence or absence of the dye tracer material. In such previously employed dyed tracer materials, either a subtractive color nonfluorescent sensitizer or a fluorescent sensitizer dye is dissolved in the material, thereby permitting the detection of the presence of more or less minute quantities of the material by virtue of the color or fluorescence of such quantities.

In the past, there have been cases where a plurality of visible color or fluorescent dyes have been mixed together in the same liquid carrier. However, such mixtures have not provided the duality of dye tracer effects of this invention for reasons which will be apparent from the following description of the invention and the embodiments thereof.

There are a number of useful applications where it is desirable to provide the duality of dye tracer effects of this invention, for example, where it is desired to employ a substantially nonfluorescent visible-color sensitizer having one level of dimensional sensitivity and to simultaneously employ a fluorescent sensitizer dye having a substantially different level of dimensional sensitivity. Dual-sensitivity tracers of this kind are particularly useful in connection with inspection penetrant processes, wherein it may be desired to exhibit relatively large crack defects in test parts as visible-color (nonfluorescent) indications observable under white light inspection, and to simultaneously permit the display of relatively small crack defects as fluorescent indications observable under blacklight (ultraviolet) inspection.

Another useful application of the invention is the use of a duality of visible and fluorescent tracer effects in visually estimating the thickness of a layer of the dye tracer material. Dual-sensitivity tracers of this kind may be either a liquid, a grease, a waxy substance, or a plastic (resinous) composition containing appropriate dyes in solution form. The dual-sensitivity feature of the dye indicator system may be employed as a means to measure or control the thickness of an applied coating of the liquid, grease, wax, resin, or plastic material, as the case may be.

The principal object of this invention, therefore, is to provide a dual-sensitivity dye tracer material.

Another object of this invention is to provide a fluorescent tracer effect in the presence of a nonfluorescent color tracer effect.

A further object of the invention is to provide dyed liquid tracer materials which will yield discernibly different color effects depending on the liquid film thickness.

Other and incidental objects of the invention will in part be obvious and will in part become apparent from the following description thereof when read in conjunction with the drawings, in which.

Figure 1:
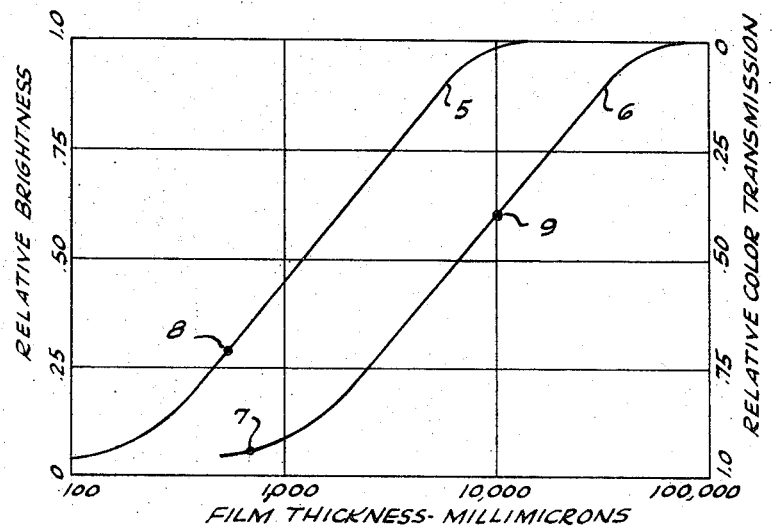
FIG. 1 is a graph which illustrates a duality of fluorescent and nonfluorescent color transition effects obtainable with a combination of dissolved fluorescent and nonfluorescent color sensitizer dyes in accordance with the invention.

In order to understand properly the following description of the invention and the embodiments thereof, it is first necessary to understand what is meant by the term "sensitizer dye." This term, as used herein, refers to a nonfluorescent color or an ultraviolet responsive fluorescent dye mixture in a solvent carrier which provides a degree of dimensional sensitivity suitable for tracer usage. This definition is mainly a matter of convention in usage of such materials, since a tracer material, in order to be useful as such, must provide fluorescence or color response in liquid film thicknesses smaller than about 1000 millimicrons.

Improved measurement techniques utilizing a traveling microscope with a photocell readout setup in conjunction with the so-called Meniscus Method instrument of my U.S. Pat. No. 3,107,298, for "Apparatus for the Measurement of Fluorescent Tracer Sensitivity," have shown that the dimensional thresholds of fluorescence or color response for useful inspection tracer materials are, in practically all cases, smaller than about 1000 millimicrons. For purposes of this specification, the dimensional threshold of fluorescence or color response of a given tracer material is defined as the film thickness at which the fluorescent brightness or relative color depth, as the case may be, is about 6.65% of the maximum value as observed in relatively thick layers of the tracer liquid.

Sensitizer dyes are clearly differentiated from ordinary solutions of dyes or coloring materials in that such ordinary dye solutions do not normally provide a color or fluorescence response in liquid film thicknesses smaller than about 1000 millimicrons. Ordinary dye solutions are often useful in providing color or fluorescent effects in thick films or layers of liquid, as in paints, lacquers, or even in certain types of indicator materials where the indicated thicknesses are relatively large. Such dyes and dye mixtures are properly designated "color-former dyes" as contrasted with "sensitizer dyes" which provide color or fluorescence response in relatively thin films.

Sensitizer dyes may be either substractive color (non-fluorescent) or fluorescent in character, and the sensitizer dye mixtures or solutions may provide fluorescence or color response at liquid film thicknesses smaller than about 1000 millimicrons. Such highly sensitive mixtures are known and properly designated by the term "dye tracers." The above stated differentiation between the two types of dye materials has been described in detail in my copending application, Ser. No. 492,674, filed Oct. 4, 1965, now issued Pat. No. 3,386,920. In addition, the effect of dimensional thresholds of color and fluorescence response and a means for measuring same is described and claimed in my above-mentioned Pat. No. 3,107,298, of Oct. 15, 1963.

My U.S. Pat. No. 3,386,920 relates to fluorescent sensitizer dyes and tracer compositions which employ such dyes in solution form. It will be understood that non-fluorescent dyes may also be employed as sensitizers, and it will be further understood that nonfluorescent dyes may be employed either as sensitizers or as color-formers, the distinction being that when a given nonfluorescent dye is employed at a concentration sufficient to provide a dimensional threshold of color response smaller than about 1000 millimicrons, the dye ceases to be a color-former and becomes a "sensitizer," that is, for the purpose of this invention.

Although many kinds of nonfluorescent color and fluorescent tracer materials are in common use, each and every one is characterized by a non-multiple response function insofar as the dimensional threshold of tracer response is concerned. In other words, presently employed dyed liquid tracers exhibit a single color characteristic or a single fluorescence characteristic, as the case may be, that is, with respect to tracer activity. Furthermore, the purpose of such materials is merely to provide indications of the presence of the dye tracer in the form of a single nonfluorescent or fluorescent response without any regard to a desirability or usefulness of a duality of color effects.

The present invention contemplates the use of a combination of at least two dyes in solution, one dye being nonfluorescent, and the other dye being fluorescent. Dye mixtures which consist of a single fluorescent dye, or a plurality of fluorescent dyes in which one or more of the dyes exerts merely a color-forming function, and in which there is no nonfluorescent component, fall outside the scope of the present invention for reasons which will become apparent from the following description.

In addition to the many known nonfluorescent dyes, which exhibit visible color only, and the many known fluorescent dyes which do not exhibit any appreciable visible color effects, it will be understood that certain of the known fluorescent dyes exhibit visible-color response in addition to a fluorescence response. For example, the dye known as C.I. Basic Violet 10 (Rhodamine B) fluoresces a reddish orange color in dilute solutions in certain solvents. At the same time, the dye solution exhibits a visible red coloration. Similar effects are found in the dye C.I. Acid Yellow 73 (Fluorescein) which fluoresces green in dilute water solution, while the solution at the same time exhibits a visible yellow color. Another similar example is the dye C.I. Acid Red 87 (Eosine J) which fluoresces yellow in dilute water solution, and at the same time exhibits an orange-pink visible coloration in solution. Many other dyes have similar features, a few of such dyes being listed as follows:

C.I. Basic Red 1 (Rhodamine 6G)
C.I. Acid Red 52 (Sulpho Rhodamine B)
C.I. Acid Violet 7 (Acid Red 6B)
C.I. Acid Red 50 (Sulpho Rhodamine G)
C.I. Basic Yellow 1 (Thioflavine TC)
C.I. Basic Yellow 2 (Auramine 00)
C.I. Solvent Yellow 34 (Auramine Base)
C.I. Acid Yellow 7 (Brilliant Sulpho Flavine FFA)

In practically all cases where a dye exhibits both fluorescence and visible color, there occurs a pronounced effect of "concentration quenching" of fluorescence. As the concentration of the dye in solution is increased above some critical value, which is usually on the order of one or two percent or less, the fluorescence response of the dissolved dye tends to become quenched or diminished to a point where it may become essentially nonexistent or at least ineffective. Thus, such fluorescent dyes, when employed at high values of concentration, become in effect nonfluorescent dyes, and act in the manner of nonfluorescent dyes.

I have discovered that a fluorescent dye which also exhibits visible color may be treated as though it is a mixture of two dyes, one fluorescent and one nonfluorescent. I have also found that "$k$" values may be assigned to each of the features, fluorescence and visible color, in accordance with the procedures outlined in my above-mentioned U.S. Pat. No. 3,386,920. Furthermore, I have found that the "$k$" values for the visible components of practically all visible-color fluorescent dyes are relatively small, such that relatively high concentrations of dye are required in order to provide a useful tracer function, that is, to provide a visible color response at liquid film thicknesses smaller than about 100 millimicrons.

I have found that even in cases where the "$k$" value for the fluorescent component of a dye may be relatively large, sufficient to permit practical usage of the dye as a fluorescent tracer, the "$k$" value of the visible component is invariably considerably smaller, such that high concentrations of dye must be employed if a visible color response is wanted in relatively thin liquid film.

When high concentrations of a visible-color fluorescent dye are employed, sufficient to provide a satisfactory visible-color tracer function, then it turns out that the fluorescent response usually becomes quenched and the dye becomes, in effect, a nonfluorescent dye. Conversely, if the concentration of the dye is kept low enough to avoid concentration quenching of fluorescence, it is found that the visible-color dimensional sensitivity, or the ability of the dye solution to provide visible-color response in thin films, becomes too low for practical tracer usage. Many of the visible-color fluorescent dyes which are classed as "fluorescent sensitizers" in my above-mentioned U.S. Pat. No. 3,386,920, may be utilized as visible-color tracers, but when so used the fluorescence response becomes depressed or quenched, as described above.

Accordingly, it will be understood that I may employ, as visible-color tracer dyes, certain of the fluorescent dyes listed as fluorescent sensitizers in my U.S. Pat. No.

3,386,920, but when so utilized, as for the purpose of this invention, such dyes are used as nonfluorescent dyes, and are considered to be nonfluorescent dyes for such usage. In general, though, I may find it more convenient to select a nonfluorescent visible-color dye as the visible component of my dual-sensitivity tracer compositions, the selection being made from the group of many thousands of available nonfluorescent dyes. This is because many considerations other than fluorescence response may enter into the selection of a dye, such as color response, solubility features in various solvent liquids, or stability of the dye under certain conditions of usage.

In some cases, I may employ two visible-color fluorescent dyes in the same solution, one being employed for its fluorescence response, the other being employed for its visible-color response. For example, I may utilize an Eosine-type dye to provide a fluorescence response, maintaining its concentration at a point below the critical threshold of concentration quenching. Under such conditions, a satisfactory fluorescence response may be obtained at liquid film thicknesses on the order of 500 millimicrons. However, the visible-color response may be found to be excessively weak, or below "threshold," even at liquid film thickness values greater than 1000 millimicrons.

If now, I dissolve a second visible-color fluorescent dye, such as C. I. Acid Red 94 (Rose Bengale), this second dye may be dissolved to a concentration sufficient to yield a good visible-color response in thin liquid films, while at the same time it will not materially increase the quenching of fluorescence of the Eosine dye. The Rose Bengale dye provides little or no fluorescence response in the dye mixture, this feature being provided by the Eosine dye. When I desire to obtain a more pronounced effect of fluorescence in the dye solution, I may utilize a third fluorescent "sensitizer" dye which may be in the nature of a colorless fluorescent brightening agent. Finally, when such a "third" colorless sensitizer dye is employed, I may find it possible to increase the concentration of the Eosine dye to a point well beyond its threshold of concentration quenching, whereby a considerably stronger visible-color response is obtained in thin liquid films, while at the same time a strong fluorescence effect is also retained in thin liquid films.

In any event, by employing a plurality of dyes in solution, at least one of which is fluorescent, and at least one other of which is effectively nonfluorescent, I have found it possible to provide tracer compositions which yield a discernible duality of dimensional threshold features, both of such features being of practical utility in tracer usage where fluorescence and visible-color response effects at liquid film thickness values smaller than about 1000 millimicrons are wanted.

Referring now to FIG. 1, two response curves 5 and 6 are shown for a fluorescent sensitizer and a nonfluorescent sensitizer dye, respectively, both response characteristics of relative brightness and relative color transmission being plotted against film thickness. It will be noted that below a certain critical film thickness, the fluorescent response of a fluorescent dye tracer or the color response of a nonfluorescent dye tracer, as the case may be, undergoes a transition from a maximum condition down to substantially zero response. If two different sensitizer dyes, one fluorescent and one nonfluorescent, are evaluated separately as to their transition effects, two different response curves may be obtained such as those illustrated by curves 5 and 6 in FIG. 1. When fluorescent and nonfluorescent sensitizer dyes are simultaneously dissolved in a liquid carrier solvent, the same response curves result, although certain masking effects may occur as will be described. However, as long as the dimensional sensitivity of the fluorescent sensitizer component is greater than that of the nonfluorescent sensitizer component, there will be relatively little interference between the two tracer effects.

If, for example, curve 5 represents the fluorescence transition characteristic of the fluorescent dye, and curve 6 represents the transition of color response of the nonfluorescent color sensitizer dye, then it is found that at film thicknesses greater than about 800 millimicrons, as indicated by point 7, the visible color response contributed by the nonfluorescent sensitizer dye begins to increase sharply, and as the color density increases, it tends to obscure the fluorescence of the fluorescent sensitizer dye. However, at a film thickness below 800 millimicrons, as indicated by point 8, the visible color density contributed by the visible color sensitizer is quite small, while at the same time there is an appreciable fluorescence resulting from the fluorescent sensitizer dye. Hence, at the smaller film thicknesses, below about 800 millimicrons in this illustration, the fluorescence effect can be clearly seen without appreciable interference from the nonfluorescent color sensitizer dye.

It will be understood that if the color character of the two curves 5 and 6 is reversed, such that curve 5 represents a visible-color transition and curve 6 represents a fluorescence transition, then the visible-color effect will act to mask the effect of fluorescence response. Accordingly, the dimensional threshold of fluorescence response must always be smaller than the dimensional threshold of visible-color response, that is, for the purpose of this invention.

In my U.S. Pat. No. 3,386,920, I have described a method and means of assigning Sensitivity Index values to solutions of sensitizer dyes, and I have pointed out that the Sensitivity Index ($I_s$) for a given solution of dye may be expressed as a "constant" $k$ multiplied by the dye concentration (C), or $I_s = k \times C$. I have also indicated that so-called "dilution curves" may be drawn on a suitable chart, thereby providing a graphic relationship between Sensitivity Index values and dimensional thresholds of fluorescence and color transition.

More recently, an improved understanding of the effects of fluorescence and color response in thin films of dyed liquid has been gained, and a detailed discussion of such matters has been published in the Instrument Society of America (ISA) Transactions, vol. 8, No. 1, 1969, pp. 29–41, as a technical article entitled "Dimensional Transition Effects in Visible Color and Fluorescent Dyed Liquids." Accordingly, it is now known that fluorescence and visible-color response in dyed liquid films follows approximately the well known Beer's law.

Figure 2:
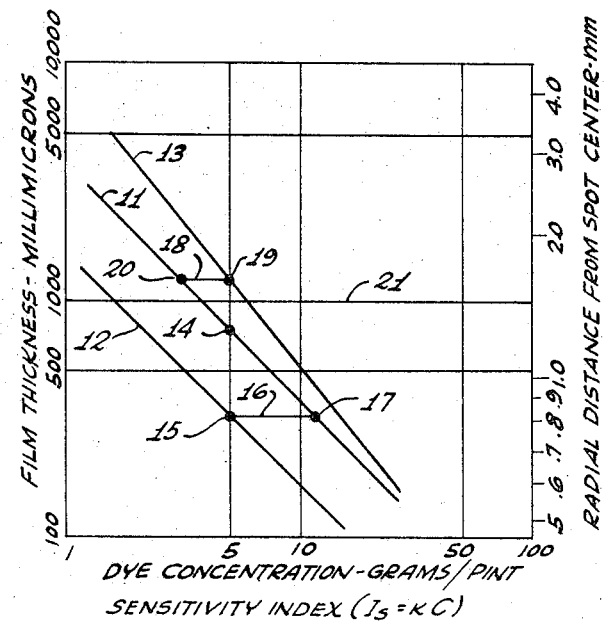
FIG. 2 is a chart employable in conjunction with the use of the dual-sensitivity tracers of the invention, readings of said chart for particular tracers being shown.

Referring now to FIG. 2, there is here illustrated a log-log graph in which dimensional thresholds of fluorescence or color may be plotted against dye concentration. The axis of abscissas is set forth as a logarithmic scale of Sensitivity Index values, or dye concentrations expressed in terms of grams of dye pint of liquid solution. The axis of ordinates is also set forth as a logarithmic scale, this scale being expressed in terms of liquid film thickness in millimicrons, as shown on the left side of the graph, or in terms of Meniscus-Method spot radius, as shown on the right side of the graph.

The diagonal line 11 is a "theoretical" Beer's law dilution curve which may be used as a reference line from which "$k$" values for various dye materials may be derived. The diagonal line 12 is a typical dilution curve for a fluorescent dye, this particular curve being for the dye C.I. Fluorescent Brightening Agent 46, while line 13 is a typical dilution curve for a nonfluorescent visible-color dye, this particular curve being for the visible-color component of the dye C.I. Acid Red 94. In making measurements of fluorescence or visible-color dimensional thresholds at various dye concentrations, it is usually found that the slopes of the dilution curves, as illustrated by curves 12 and 13, are somewhat different than would be expected from Beer's law, such departure effects being a recently-discovered "failure" of Beer's law. Thus, the dilution curves for fluorescent and nonfluorescent dyes are not always parallel to curve 11, as would be expected if all dyes behaved in a manner consistent with Beer's law.

In any event, if we assume that the reference line 11 corresponds to the dilution characteristic of a dye substance which follows Beer's law, and which has a "$k$" value of unity, then the $I_s$ value for point 14 on this curve would be 5 at a concentration of 5 grams per point. If, now, we measure the dimensional threshold for a fluorescent dye, also at a concentration of 5 grams per pint, determining the dimensional threshold value to be 320 millimicrons, corresponding to the operating point 15 on dilution curve 12, then it will be seen that the "$k$" value for this fluorescent dye substance must be greater than unity, its actual value being determined as follows:

A horizontal line 16 is projected from point 15 until it intersects the reference line 11 at point 17. It is then determined, in this example, that the test fluorescent dye, at 5 grams per pint concentration, provides the same dimensional threshold characteristic as does the reference dye at 12 grams concentration. Accordingly, the "$k$" value for the test dye is equal to 12 divided by 5, or 2.4. In a similar manner, the "$k$" value for a nonfluorescent dye which exhibits a dilution curve corresponding to line 13 may be determined by projecting a line 18 from the operating point 19 of the visible-color dye to intersect the reference line 11 at point 20. We may then take the ratio of concentration values corresponding to points 20 and 19, or 3 divided by 5. In this case, the "$k$" value turns out to be less than unity, or to be precise .6. It will be understood that by reason of the fact that the various dilution curves of actual dyestuffs are not always parallel to the reference curve 11, the "$k$" value for a given dyestuff and solvent system may vary depending on the dye concentration, and that therefore any determination of a "$k$" value should also state the conditions under which such determination is made.

As was pointed out in my U.S. Pat. No. 3,386,920, dyes which are classed as fluorescent sensitizers may have "$k$" values which are greater than .25, in many cases greater than unity. On the other hand, most nonfluorescent dyes and soluble coloring materials have "$k$" values which are less than unity and in many cases less than .25. Furthermore, as stated above, the practical usability of a dye for tracer purposes depends on the ability of the dye, in solution, to provide a dimensional threshold feature smaller than about 1000 millimicrons. Thus, if the dilution curve of the dye can be extended to points below line 21 in FIG. 2, then the dye may be found to be useful for tracer applications.

When visible-color dyes, fluorescent or nonfluorescent as the case may be, are employed as color-formers to impart a characteristic color to a fluorescent tracer, the visible-color operating points in such usage normally fall well above the line 21 in FIG. 2. Thus, when visible-color dyes are employed in a mode of usage such that their operating points fall below line 21, they are then considered to be employed in the "sensitizer mode," and such usage is considered to be distinct and different from the "color-former mode" which is described in the 3,386,920 patent.

It will be understood that the product of Specific Sensitivity ($k$) and dye concentration (C) yields a Sensitivity Index ($I_s$) factor, and this factor adequately describes the threshold of fluorescence or color transition, as the case may be.

Dye tracers which employ combinations of fluorescent and nonfluorescent color sensitizer dyes are useful in various applications, as in certain kinds of inspection penetrant tracers. For example, it may be design a visible dye penetrant tracer in which the nonfluorescent color sensitizer component employed therein has a dimensional threshold of color response of about 750 millimicrons. This level of dimensional sensitivity would be useful in the detection of fairly gross cracks in noncritical missile components. However, in the event that such components are to be used in contact with liquid oxygen, it is extremely important that no residual penetrant inspection material may be permitted to remain on the parts after completion of the inspection penetrant process. From this latter standpoint, it is desirable to also employ a high sensitivity fluorescent sensitizer dye in the penetrant tracer so that in the course of a cleaning operation, minute residual traces of the penetrant can be detected by their fluorescence, even though no traces of visible color can be seen. This can be accomplished by means of a dual-sensitivity penetrant of the type described above.

Figure 3:
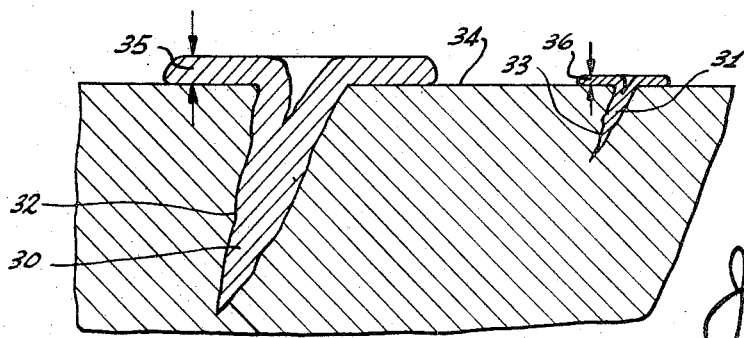
FIG. 3 is a diagrammatic representation, in cross-section, of tracer indications having different dimensional magnitudes, in which a dual-sensitivity feature of the invention is employed.

Referring now to FIG. 3, there is here illustrated in cross-section the effect of employing a dual-sensitivity inspection penetrant on a test part which has on its surface crack defects of different dimensional magnitudes. In this illustration, two surface crack defects are shown which have different dimensional magnitudes.

If a dual-sensitivity inspection penetrant having fluorescent and nonfluorescent transition characteristics similar to those illustrated in FIG. 1 is applied to such a test part, entrapments of penetrant 30 and 31 will be formed in defects 32 and 33, respectively. After surface penetrant is cleaned from the test surface 34, the entrapments of penetrant will tend to exude from the surface defects 32 and 33 to form trace films of penetrant 35 and 36, respectively. It will be seen that the exuded film of penetrant 35 from the larger defect 32 will have a greater thickness than the exuded film 36 from the smaller flaw 33.

Now if, for example, the thickness of the exuded film 35 is about 10,000 millimicrons, corresponding to point 9 in curve 6 of FIG. 1, then this tracer film will have a visible color. On the other hand, if the exuded trace film 36 from defect 33 is only about 700 millimicrons, then this film of tracer liquid will be below the threshold of visible color response. However, inspection under black light will reveal a fluorescence response in the defect exudation 36. Thus, the two exudations 35 and 36 will exhibit difference fluorescence and color response features depending on their film thicknesses.

In many inspection tracer processes, developers are utilized for the purpose of "expanding" or brightening the defect indications. In some cases, the developer acts merely to draw out entrapments of penetrant tracer, for example, from surface cracks, so that they may become visible by inspection under white light or black light, as the case may be. In other cases, as in the dilution-expansion developers described in my U.S. Pat. No. 3,184,596, issued May 18, 1965, the developer produces an effective expansion of the thickness of the exuded film of tracer, thereby shifting its operating point of visibility to produce an improvement in see-ability of the defect indication. In any event, the defect exudations 35 and 36 of FIG. 3, if treated with a developer, will become enhanced in their see-ability. It will be understood that the use of a developer on dual-sensitivity tracer indications will act to enhance flaw detection capability by a factor which will depend on the effective "expansion" of the indications, and correspondingly smaller defects will become detectable.

Any suitable indicator dyes may be used for the purpose of the invention, it being only necessary that at least one dye in the dual-sensitivity tracer formulation be fluorescent and at least one other dye be nonfluorescent. A wide variety of suitable fluorescent sensitizer dyes has been described and claimed for certain usages in my above-mentioned copending application, Ser. No. 492,674, now issued Pat. No. 3,386,920. Among the various fluorescent dyes which may be used are certain coumarin dyes, stilbene dyes, bis-azo dyes, and heterocyclic dyes.

In my now-issued Pat. No. 3,386,920, I have described and claimed the use of color-former dyes in conjunction with so-called sensitizer dyes, all of such dyes being employed in solution form. When thus used, the color-former dye imparts a characteristic color to the dye solution. In all such cases, where it is desired merely to shift the color of a fluorescent dye solution, the color-former dye or dyes, when used, are employed at concentrations which are relatively low, and under these conditions, they do not yield useful visible-color tracer characteristics. It will be understood, therefore, that the use of nonfluorescent or visible-color fluorescent dyes as color-formers, at concentratons less than would be required to provide a useful visible-color tracer function, falls outside the scope of the present invention.

Another important limitation in the use of visible-color and fluorescent dyes, in accordance with the present invention, is that the Sensitivty Index ($I_s$) values of the vsible-color and fluorescent components of the dye tracer composition must have a well-defined relationship with respect to each other. Specifically, the Sensitivity Index value for the fluorescent component must be larger than that for the visible-color component.

For the purpose of the present invention, it is essential that, when a plurality of visible-color and fluorescent dyes are employed in a tracer composition to provide a duality of dimensional threshold effects, the Sensitivity Index for the fluorescent component of the tracer must be larger than the Sensitivity Index of the visible-color component. Expressing this requirement in another way, the dimensional threshold of fluorescence response for the fluorescent component of the dye mixture must be smaller than the dimensional threshold of color response for the visible-color component of the dye mixture.

The extent to which the $I_s$ value for the fluorescent component is larger than the $I_s$ value for the visible-color component is not limited to any particular value or degree. Stated another way, the extent to which the dimensional threshold of fluorescence response is smaller than the dimensional threshold of visible-color response is not limited to any particular value or degree. Thus, it will be seen that any desired $I_s$ values, or dimensional threshold values, may be selected provided only that the above-mentioned limitatons are adhered to.

As mentioned above, nonfluorescent visible color dyes are usually less effective than fluorescent dyes in yielding a visible-color response at small film thicknesses. However, there are a sufficient number of suitable nonfluorescent dyes to choose from so that a sensitizer dye may be selected to meet virtually any requirement of solvent system compatability and any requirement of dimensional sensitivity, down to about 500 millimicrons. It will be understood that in some cases, a visible-color dye, when used as a visible-color sensitizer, may also exhibit a certain amount of fluorescence response. Usually, however, this fluorescence is quenched and is insufficient to provide the dual-sensitivity effect of the present invention, so that a separate fluorescent dye must be included in the tracer formulation. Among the many suitable visible-color dyes which are usable as a nonfluorescent or subtractive-color component in a dual-sensitivity inspection tracer, the following are listed by way of examples. The dye designations given are taken from the "Color Index" published by the Society of Dyers and Colourists, Yorkshire, England.

C.I. Acid Blue 104
C.I. Basic Blue 5
C.I. Basic Blue 9
C.I. Basic Violet 1
C.I. Solvent Blue 19
C.I. Solvent Blue 20
C.I. Basic Green 1
C.I. Basic Green 4
C.I. Solvent Yellow 2
C.I. Solvent Red 16
C.I. Solvent Red 26
C.I. Solvent Red 27

As indicated above, various fluorescent dyes also exhibit a visible-color component. Among the various dyes of this kind which may be employed in sufficiently high concentrations such that the visible-color component acts in the nature of a nonfluorescent visible-color sensitizer dye, are the following:

C.I. Direct Blue 41 (Brillian Sky Blue 8GA)
C.I. Basic Violet 10 (Rhodamine B)
C.I. Basic Red 1 (Rhodamine 6G)
C.I. Acid Red 52 (Sulfo Rhodamine B)
C.I. Acid Red 94 (Rose Bengale)
C.I. Acid Violet 7 (Eosine J)
C.I. Solvent Red 49 (Rhodamine B Base)
C.I. Solvent Red 45 (Spirit Eosine)

While the usage of a nonfluorescent color component in the dual sensitivity inspection tracers of the invention is not restricted to any particular color, I have found that for the most part, a visible blue color may be preferred for the reason that most of the fluorescent sensitizers emit a blue or bluish white color, and less interference or masking occurs when a visible nonfluorescent blue component is used. I have found it possible to use red, orange, and green dyes as well as blue dyes. Yellow dyes may also be used, particularly in combination with blue dyes to produce a green color, but their tinctorial strengths are usually quite low when they are used alone, so that satisfactory see-ability of indications may be impaired.

I have discovered that the visible-yellow components of fluorescent yellow or green-yellow dyes are not suitable for use as visible-color tracers. This is because the tinctorial strength or color-contrast of fluorescent yellow dyes is not sufficient to provide good see-ability under typical conditions of usage in white light. Fluorescent green or yellow dyes, having a visible yellow component, are commonly used in fluorescent tracer compositions for the purpose of shifting the fluorescent color from a blue shade, as provided by a blue-fluorescing sensitizer dye, to a green color which may more closely approximate the spectral peak of sensitivity of the human eye. When so used, such yellow dyes may be highly effective in improving the performance capability of the tracer with respect to its fluorescent brightness. However, when such dyes are used for their visible yellow color, even at relatively high concentrations, the very purity and clarity of color which makes them effective as fluorescent color-formers acts to render them ineffective from the standpoint of tracer see-ability under white light inspection.

On the other hand, certain of the nonfluorescent dyes which may be classed as yellow dyes may often be of a sufficiently deep shade of yellow, or may be orange, reddish, or even brown in character, and these may often be used successfully in the dual-sensitivity tracer compositions of the invention. It will be understood, therefore, that fluorescent yellow dyes are not considered to be useful for the nonfluorescent component of a dual-sensitivity tracer composition, whereas ordinary nonfluorescent yellow dyes may be considered to be useful and applicable for such purposes. Stated differently, the visible-yellow component of a fluorescent yellow dye is not considered to be a "nonfluorescent tracer dye," that is, for the purpose of the invention.

With regard to the carrier for the plurality of dye materials which may be used in the compositions of the invention, this may be any suitable liquid, grease, wax, resin or plastic material in which the dye materials may be dissolved. I make no restrictions on the substances which may be used as tracer carriers, the selection of a particular carrier material being dependent on the particular use application of the tracer. For example, any one or a combination of a wide variety of liquid materials may be used as carriers in case the tracer is to be used as an inspection penetrant. If the tracer is to be used as a dual-sensitivity marking crayon or transfer wax, any one of a variety of waxy materials may be employed. For dual-sensitivity tracers formulated as solder fluxes, either rosin or a suitable liquid such as a polyethylene glycol may be used as a carrier. Finally, in the case of plastic surface coaters, which are desired to exhibit a dual-sensitivity feature, it will be understood that any one of a wide variety of resinous or plastic substances may be used as carriers for the dye materials.

The following examples illustrate the preparation and usage of typical dual-sensitivity inspection tracers.

EXAMPLE I

A water-washable inspection penetrant was prepared in accordance with my U.S. Pat. No. 3,282,843, of Nov. 1, 1966, in which the indicator dye structure was as follows:

Self-emulsifiable penetrant—1 gallon
C.I. Brightening Agent 68 (Color Index designation)— 64 grams
C.I. Brightening Agent 75 (Color Index designation)— 16 grams
C.I. Solvent Blue 20 (Color Index designation)—128 grams The above-described penetrant formulation was applied to a jet engine turbine bucket, where it was allowed to dwell for about five minutes. The turbine bucket was then washed for about thirty seconds under a high pressure spray of water. Excess water was removed from the test part by means of a jet of compressed air, and the part was allowed to dry. Due to the dark metallic color of the turbine bucket, inspection under white light revealed no evidence of surface flaw indications. Under black light inspection, numerous brightly fluorescent defect indications could be seen.

A developer was sprayed onto the turbine bucket, the developer being a dilution-expansion developer of the type described in my U.S. Pat. No. 3,184,596. Inspection of the developed test surface under white light revealed a visible greenish blue indication which, upon close examination, was found to be a relatively large crack in the leading edge of the turbine bucket airfoil. Inspection under black light revealed, in addition to the indication of the leading edge crack, a pattern consisting of a mass of brightly fluorescent pinpoints, which upon close examination was seen to result from a fine surface porosity in the turbine bucket.

Accordingly, a dual-sensitvity inspection penetrant performance was provided, in which gross cracks could be displayed as visible-color indications, and fine cracks or surface porosity indications could be displayed as fluorescent indications.

A similar dual-sensitivity inspection penetrant was formulated, using the same dye structure as indicated above, but utilizing a penetrant carrier liquid of the type described and claimed in my U.S. Pat. No. 3,311,479, of Mar. 28, 1967. It was found that similar dual-sensitivity inspection penetrant performance was obtained, when the penetrant composition was employed in the so-called post-emulsifier process.

EXAMPLE II

A dual-sensitivity LOX-usage inspection penetrant was prepared as follows:

Fluorocarbon liquid (Fluorolube S–30, Hooker Chemical Co.)—128 ml.
C.I. Solvent Blue 19 (Color Index designation)—16 grams
Fluorescent sensitizer (Uvitex OB, Ciba Co.)—32 grams
Methylene chloride to make 1 gallon The above-described penetrant formulation was applied by spray to a weldment area in a tank for use with liquid oxygen (LOX). The test surface was then cleaned by means of a rinse of perchloroethylene. The cleaned test surface was developed with a dilution-expansion developer which was formulated using a mixture of fluorocarbon liquid and methylene chloride as the developer vehicle.

Examination of the test area under white light showed the presence of some relatively large heat-fracture cracks as fine visible blue linear indications, while inspection under black light showed, in addition to the large crack indications, numerous small pinpoint indications which, under close examination, were found to be gas porosity defects in the weldment. Tests on the penetrant formulation by the standard "impact test" showed that the formulation was non-reactive with liquid oxygen.

EXAMPLE III

In the process for applying an insulating layer of polyester plastic onto surfaces of metallic parts, it was desired to control the thickness of the plastic coating to a value close to 500 millimicrons. A combination of fluorescent dye, C.I. Fluorescent Brightening Agent 45, and nonfluorescent blue dye, C.I. Solvent Blue 19, was added to the liquid polyester plastic in carefully measured increments. After each addition of dye, a measurement was made using the Meniscus Method, and the concentration of each dye was determined such that the dimensional threshold of fluorescence response was about 300 millimicrons and the dimensional threshold of color response was about 700 millimicrons.

The dyed liquid plastic mixture was thinned by the addition of methylethyl ketone, and an appropriate amount of benzoyl peroxide catalyst was added to the mixture. A part to be coated was dipped in the thinned mixture and was hung up to drain and dry. Examination of the coated part under white light showed the presence of a bluish tint, which indicated that the thickness of the coating was greater than 700 millimicrons. Additional tests were made under conditions of increasing dilution of the mixture with methylethyl ketone, until a point was reached where the coating showed only a faint, almost invisible trace of bluish tint. Examination under black light showed the presence of a bluish fluorescence having medium brightness. It was concluded that the coating thickness obtained with the thus-determined dilution condition would be approximately the desired 500 millimicrons. A measurement of the coating thickness by electronic methods showed that the thickness was within the range of about 350 to 650 millimicrons. Subsequent parts were coated using the same color and fluorescence response characteristics to maintain a control of coating thickness.

EXAMPLE IV

Various dye mixtures were tested for the purpose of developing a dual-sensitivity ball-point pen marking ink. At the outset, a dye solution was prepared as follows:

|  | Percent |
| --- | --- |
| C.I. Fluorescent Brightening Agent 26 | 15 |
| C.I. Acid Violet 7 | 1 |
| Diethylene glycol | 84 |

The above ink was found to exhibit good fluorescence response at film thicknesses smaller than 1000 millimicrons, and a good visible-red color in film thicknesses greater than 1000 millimicrons. Measurements of dimensional threshold of response made on a 15% solution of the Brightening Agent 26 and a 1% solution of the Acid Violet 7, separately, showed that the thresholds of response were 56 millimicrons and 1200 millimicrons, respectively. It was concluded that the visible red color of the ink was too weak to be useful for tracer purposes in extremely thin films. In addition, the diethylene glycol vehicle was found to be excessively hygroscopic. Accordingly, substitutions were made in the ink constituents, and the following ink formulation was prepared:

|  | Percent |
| --- | --- |
| C.I. Fluorescent Brightening Agent 46 | 4 |
| C.I. Acid Red 87 | 7 |
| Ethoxylated nonylphenol (9 mols ethylene oxide) | 89 |

The above ink formulation was found to yield a brilliant orange-red fluorescence in thin films, thinner than 1000 millimicrons, but at such film thicknesses the visible red color was found to be fair but somewhat weak. A test was made on an ink formulation similar to the above, in which the C.I. Fluorescent Brightening Agent was deleted, and it was found that the fluorescence of the C.I. Acid Red 87 was quenched due to its concentration to a point where the dye was acting essentially as a nonfluorescent red dye. The dimensional threshold of color transition of this dye solution was measured and was found to be 133 millimicrons, but the tinctorial power was somewhat weak. A similar measurement of the dimensional threshold of fluorescence transition was made on a 4% solution of the C.I. Fluorescent Brightening Agent 46, and this threshold dimension was found to be about 105 millicrons.

A third dye, C.I. Acid Red 94, was added to the above mixture to a concentration of 3%. This third dye acted to enhance the intensity of the visible red color, and shifted the color to a more satisfactory shade of red. A separate measurement of dimensional threshold of color transition of a 3% solution of the Acid Red 94 dye showed that its threshold of color response was about 420 millimicrons.

The combination of the above-identified dyes, in the above-stated ink formulation, provided a dual-sensitivity marking ink which was capable of exhibiting both fluorescence and visible-color response at film thickness values smaller than 1000 millimicrons. The thus-prepared ink was used in a ball-point pen as a writing ink for use on documents in which an anti-fraud function was wanted, in accordance with the objectives of my copending application, Ser. No. 728,458, filed May 13, 1968, for "Method and Means for Preventing Fraud in Documents."

It was found that the ink was non-clogging in a ball-point pen, and could be used for writing on paper documents such as checks, sales slips, or various business forms, providing a satisfactory red color which was visible in white light. It was further found that in attempted erasures, as for the fraudulent alteration of a document, the visible red color could be removed from an imprinted document, but a fluorescent mark always remained which was extremely difficult to remove without practically destroying the surface of the paper.

Accordingly, it was determined that the thus-prepared ball-point pen ink provided a dual-sensitivity characteristic of practical utility; a visible-red mode of dimensional sensitivity which was suitable for providing visible red color in ink films thinner than about 1000 millimicrons, and a fluorescent mode of dimensional sensitivity which was suitable for providing a safety feature in the prevention and detection of erasures of imprint markings.

EXAMPLE V

A formulation similar to that of Example IV was compounded using as the carrier for the dyes an ethoxylated nonylphenol having about 30 mols of ethylene oxide per mol of nonylphenol. This carrier is a waxy solid at room temperature, but it was found that it could be melted readily and the dyes dissolved therein. The melted wax solution of dyes was cast into crayon-type sticks for direct writing usage, and for transfer usage the melted wax was blade-coated onto a paper backing. It was found that satisfactory dual-sensitivity markings were obtainable with the thus-prepared cryon sticks, and in the case of the coated transfer paper, a satisfactory dual-sensitivity impression mark was obtainable in the manner of carbon-paper transfer when the thus-coated transfer paper was used as a transfer tissue with impressions by typewriter, pencil, or ball-point pen.

It will be seen from the foregoing that the dual-sensitivity tracer compositions of the invention permit thin films of the tracer to be selectively revealed by fluorescence and visible-color response, depending on the thickness of the tracer film. In addition, it will be seen that the carrier in which the fluorescent and visible-color sensitizer dyes are dissolved may be any suitable material selected from the group consisting of liquids, greases, waxes, resins, and plastics.

Although the invention has been described with reference to particular embodiments thereof, it will be understood that various changes and modifications may be made therein, without departing from the spirit of the invention nor the scope of the appended claims.

I claim:

1. A dual-sensitivity dyed tracer composition for use as a film of 1000 millimicrons or less consisting essentially of a carrier in which there is dissolved at least two different dyes at least one of which is a fluorescent sensitizer dye and at least one of which is a different nonfluorescent visible-color sensitizer dye at the concentration at which it is present in the solution, both of said dyes being present in amounts sufficient ot provide thresholds of dimensional sensitivity smaller than about 1000 millimicrons, respectively, and the dimensional threshold of fluorescence response of said fluorescent sensitizer dye being smaller than the dimensional threshold of visible-color response of said nonfluorescent visible-color sensitizer dye.

2. In an inspection process in which thin films of 1000 millimicrons or less of a dyed tracer composition are selectively revealed by fluorescence and visible-color response, the step of applying a dual-sensitivity dyed tracer to a test surface, said dual-sensitivity tracer consisting of at least two different dyes at least one of which is a fluorescent sensitizer dye and at least one of which is a different nonfluorescent visible-color sensitizer dye at the concentration at which it is present in the solution, both of said dyes being dissolved in a carrier, and both of said dyes being present in amounts sufficient to provide thresholds of dimensional sensitivity smaller than about 1000 millimicrons, respectively, and the dimensional threshold of fluorescence response of said fluorescent sensitizer dye being smaller than the dimensional threshold of visible-color response of said nonfluorescent visible-color sensitizer dye.

3. A dyed tracer composition in accordance with claim 1 in which said carrier is at least one member selected from the group consisting of liquids, greases, waxes, resins, and plastics.

4. A process step in accordance with claim 2 in which said carrier is at least one member selected from the group consisting of liquids, greases, waxes, resins, and plastics.

References Cited

UNITED STATES PATENTS

| | | | |
|---|---|---|---|
| 2,113,090 | 4/1938 | McKeag et al. | 91—70 |
| 2,920,203 | 1/1960 | Switzer et al. | 250—71 |
| 3,028,338 | 4/1962 | Parker | 252—301.2 |
| 3,386,920 | 4/1968 | Alburger | 252—301.2 |

TOBIAS E. LEVOW, Primary Examiner

A. P. DEMERS, Assistant Examiner

U.S. Cl. X.R.

73—104; 106—19, 22; 250—59, 71, 71.5; 252—408